US012451656B2

(12) United States Patent
Liang et al.

(10) Patent No.: US 12,451,656 B2
(45) Date of Patent: Oct. 21, 2025

(54) CONNECTOR AND ELECTRIC APPARATUS

(71) Applicant: CONTEMPORARY AMPEREX TECHNOLOGY (HONG KONG) LIMITED, Hong Kong (CN)

(72) Inventors: Shijie Liang, Ningde (CN); Yan Li, Ningde (CN); Qifeng Chen, Ningde (CN); Kangyu Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 307 days.

(21) Appl. No.: 18/450,706

(22) Filed: Aug. 16, 2023

(65) Prior Publication Data
US 2023/0396028 A1 Dec. 7, 2023

Related U.S. Application Data

(63) Continuation of application No. PCT/CN2021/127724, filed on Oct. 29, 2021.

(51) Int. Cl.
H01R 13/66 (2006.01)
H01M 10/42 (2006.01)
H01R 13/52 (2006.01)

(52) U.S. Cl.
CPC ...... *H01R 13/6683* (2013.01); *H01M 10/425* (2013.01); *H01R 13/5205* (2013.01); *H01M 2220/20* (2013.01); *H01R 2201/26* (2013.01)

(58) Field of Classification Search
CPC ............ H01R 13/6683; H01R 13/5205; H01R 2201/26; H01M 10/425; H01M 2220/20
(Continued)

(56) References Cited

U.S. PATENT DOCUMENTS 8,414,326 B2 * 4/2013 Bowman ............... H01R 24/42
439/913
10,063,008 B2 8/2018 Kawai et al.
(Continued)

FOREIGN PATENT DOCUMENTS

CN 112563831 A 3/2021
CN 212991379 U 4/2021
(Continued)

OTHER PUBLICATIONS

International Search Report for International Application PCT/CN2021/127724, mailed Jul. 5, 2022.
(Continued)

*Primary Examiner* — Gary F Paumen
(74) *Attorney, Agent, or Firm* — Ladas & Parry LLP

(57) ABSTRACT

Embodiments of this application provide a connector and an electric apparatus. The connector includes a mounting base, a connection terminal, and a temperature sensor. The connection terminal is fixed to the mounting base, where the connection terminal includes a first connection portion and a second connection portion disposed opposite each other, the first connection portion is configured to electrically connect to an external plug connector, and the second connection portion is configured to electrically connect to an external wire. The temperature sensor is in contact with the connection terminal and configured to detect temperature of the connection terminal. The connector provided in this application can detect the temperature of the connection terminal to help a user find operation anomaly of the connector in time, thereby improving the use safety.

10 Claims, 6 Drawing Sheets

(58) Field of Classification Search
USPC .......................................................... 439/488
See application file for complete search history.

(56) References Cited

U.S. PATENT DOCUMENTS

| | | | | |
|---|---|---|---|---|
| 10,389,056 | B2 * | 8/2019 | Suzuki | H01R 13/426 |
| 10,644,462 | B2 * | 5/2020 | Shimizu | H01R 13/6683 |
| 10,644,463 | B2 * | 5/2020 | Tanizaki | H01R 13/6683 |
| 10,833,458 | B2 * | 11/2020 | Sarraf | G01K 1/18 |
| 2016/0111831 | A1 * | 4/2016 | Kawai | H01R 13/6683 |
| | | | | 439/620.21 |
| 2018/0048090 | A1 * | 2/2018 | Kawai | H01R 13/5829 |
| 2019/0199040 | A1 * | 6/2019 | Tanizaki | H01R 13/6683 |
| 2019/0334293 | A1 | 10/2019 | Iwami et al. | |
| 2020/0067237 | A1 * | 2/2020 | Sarraf | G01K 1/18 |
| 2021/0078419 | A1 * | 3/2021 | Lyon | G01K 1/14 |
| 2021/0242638 | A1 * | 8/2021 | Saito | H01R 13/447 |
| 2022/0360028 | A1 * | 11/2022 | Dou | H01R 13/11 |
| 2022/0385001 | A1 * | 12/2022 | Zhu | H01R 13/6683 |

FOREIGN PATENT DOCUMENTS

| | | | | | |
|---|---|---|---|---|---|
| CN | 213520552 | U | | 6/2021 | |
| CN | 213812634 | U | | 7/2021 | |
| DE | 102018130835 | A1 | | 6/2020 | |
| EP | 3825667 | A1 | * | 5/2021 | ............... G01K 1/14 |
| EP | 3863123 | A1 | * | 8/2021 | ......... H01R 13/6683 |
| EP | 3920343 | A1 | * | 12/2021 | ............. H01R 13/46 |
| JP | 2020004630 | A | | 1/2020 | |

OTHER PUBLICATIONS

1 Extended European Search Report for EP application No. 21961954.1, dated Mar. 4, 2024.

* cited by examiner

CONNECTOR AND ELECTRIC APPARATUS

CROSS REFERENCE TO RELATED APPLICATION

This application is a continuation of International Patent Application No. PCT/CN2021/127724, filed on Oct. 29, 2021, which is incorporated by reference in its entirety.

TECHNICAL FIELD

This application relates to the technical field of energy storage devices, and in particular, to a connector and an electric apparatus.

BACKGROUND

With the rapid development of modern society and the improvement of the living standards of people, vehicles have gained increased popularity, resulting in rapid rise of the vehicle production and sales.

In the prior art, electric parts in a vehicle are connected to a battery through a connector to implement fast plugging and unplugging. During use of vehicles, an operation anomaly of connectors leads to driving anomaly of vehicles, which in turn may cause safety accidents.

How the safety of connectors is improved is a current technical problem to be urgently solved.

SUMMARY

Embodiments of this application provide a connector and an electric apparatus to improve the safety.

According to a first aspect, this application provides a connector including a mounting base, a connection terminal, and a temperature sensor. The connection terminal is fixed to the mounting base, where the connection terminal includes a first connection portion and a second connection portion disposed opposite each other, the first connection portion is configured to electrically connect to an external plug connector, and the second connection portion is configured to electrically connect to an external wire. The temperature sensor is in contact with the connection terminal and configured to detect temperature of the connection terminal.

In the foregoing solution, with the temperature sensor disposed in direct contact with the connection terminal, the temperature of the connection terminal can be detected to help a user find operation anomaly of the connector in time, so as to avoid safety accidents caused by operation anomaly of the connector, thereby improving the safety.

In some embodiments, the connection terminal further includes an intermediate portion, the first connection portion, the intermediate portion, and the second connection portion are connected sequentially in a first direction, and the temperature sensor is in contact with the intermediate portion.

In the foregoing solution, the temperature sensor being in contact with the intermediate portion of the connection terminal facilitates electrical connection of the first connection portion and the external plug connector and electrical connection of the second connection portion and the external wire.

In some embodiments, the connection terminal is provided with a mounting hole, the mounting hole being located at the intermediate portion; and at least a part of the temperature sensor is accommodated in the mounting hole.

In the foregoing solution, with the temperature sensor accommodated in the mounting hole, the temperature sensor and the connection terminal are stable in position with respect to each other, and the temperature detected by the temperature sensor is closer to an actual temperature of the connection terminal, thereby improving the detection accuracy. The mounting hole providing space to accommodate the temperature sensor is conducive to miniaturization of the connector.

In some embodiments, the mounting base has a communication channel extending along the first direction, and the connector further includes signal wires, the signal wire being electrically connected to the temperature sensor on one end and passing through the communication channel on the other end to electrically connect to an external controller. Data collected by the temperature sensor can be transmitted to the external controller through the signal wires so that the external controller can perform processing based on the data. Making the signal wire pass through the communication channel can allow the communication channel to restrain the signal wire, thereby preventing the signal wire from interfering with the connection of the connection terminal and the external plug connector, and preventing the signal wire from interfering with the connection of the mounting base and another part when the mounting base is mounted on this another part.

In some embodiments, the connector further includes a sealing member having a through hole, the signal wire passes through the through hole, and the sealing member is disposed in the communication channel to seal the communication channel. With the sealing member disposed to seal the communication channel, water, foreign matter, and the like are unable to move from one side of the mounting base to the other side of the mounting base through the communication channel.

In some embodiments, the sealing member includes a body portion and a boss disposed on the body portion, the body portion and the boss are accommodated in the communication channel, and the boss is configured to abut against an inner wall surface of the communication channel. With the boss abutting against the inner wall surface of the communication channel, the boss is configured to abut against the inner wall surface of the communication channel. The boss may abut against both the body portion and the inner wall surface of the communication channel so that the sealing member seals the communication channel.

In some embodiments, the sealing member further includes a cover portion connected to the body portion, and the communication channel includes a guide cavity and an accommodating cavity communicating with each other; where the guide cavity gradually decreases in radial dimension along a direction from the guide cavity to the accommodating cavity, the cover portion mates with the guide cavity, and the body portion and the boss are accommodated in the accommodating cavity. The guide cavity with gradually decreasing radial dimension facilitates the insertion of the sealing member into the communication channel. The cover portion mating with the guide cavity allows the cover portion to prevent water and foreign matter from entering the communication channel, thereby further improving the sealing performance of the sealing member in sealing the communication channel.

In some embodiments, the mounting base includes a mounting cavity having a notch, the intermediate portion is inserted into the mounting cavity and connected to the mounting base, the mounting hole is disposed facing toward the notch, and the signal wire sequentially passes through the communication channel and the notch to electrically connect to the temperature sensor. The mounting cavity can restrain the movement of the connection terminal so as to improve the stability of the connection between the connection terminal and the mounting base. The mounting hole being disposed facing toward the notch allows the temperature sensor to be disposed in the mounting hole through the notch, thereby facilitating the mounting of the temperature sensor and preventing a part of the mounting base fixed to the connection terminal from interfering with wiring of the signal wire.

In some embodiments, the mounting base further includes a fixing boss protrusively disposed on an inner wall surface of the mounting cavity, the connection terminal further includes a first restraining boss and a second restraining boss that are protrusively disposed on the intermediate portion, and a restraining recess mating with the fixing boss is formed between the first restraining boss and the second restraining boss. Provision of the fixing boss, the first restraining boss, and the second restraining boss in a mating relationship avoids displacement of the connection terminal and the mounting base in the first direction, thereby improving the stability of the connection between the intermediate portion and the mounting base.

In some embodiments, the mounting hole runs through the second restraining boss. Since the second restraining boss is protrusively disposed on the intermediate portion, a radial dimension of the connection terminal at the second restraining boss is larger than a radial dimension at the restraining recess, and provision of the mounting hole on the second restraining boss can allow a deeper mounting hole, facilitating provision of a larger temperature sensor in the mounting hole.

In some embodiments, the temperature sensor is in interference fit with an inner wall surface of the mounting hole. This allows stable connection between the temperature sensor and the intermediate portion and increases a direct contact area between the temperature sensor and the connection terminal, facilitating heat transfer between the temperature sensor and the connection terminal.

In some embodiments, the connector further includes a restraining member disposed on the mounting base, the restraining member, the mounting base, and the connection terminal enclose a restraining space communicating with the mounting hole and the communication channel, and a part of the signal wire is accommodated in the restraining space. With the restraining member provided, the temperature sensor and the part of the signal wire can move only within the restraining space, so as to be restrained by the restraining member, thereby protecting the temperature sensor from interference by external forces or external impurities, and also preventing the temperature sensor 3 from moving out of the mounting hole while such movement results in inaccurate detected temperature data.

In some embodiments, multiple connection terminals and temperature sensors are provided, and the multiple temperature sensors are provided in one-to-one correspondence with the connection terminals so that the temperature of each connection terminal can be detected, thereby improving the detection accuracy.

According to a second aspect, this application provides an electric apparatus including: an electric part, a battery, a controller, and the connector according to any one of the embodiments of the first aspect. The controller is configured to control the operation of the electric apparatus, and the battery is configured to provide electrical energy for the electric part. One of the first connection portion and the second connection portion is electrically connected to the battery and the other is electrically connected to the electric part, and the temperature sensor is signally connected to the controller. The connector can allow an electrical connection between the battery and the electric part, and the temperature sensor can transmit detected temperature data to the controller, facilitating operation control of the electric apparatus by the controller according to the temperature data.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions of the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

Figure 1:
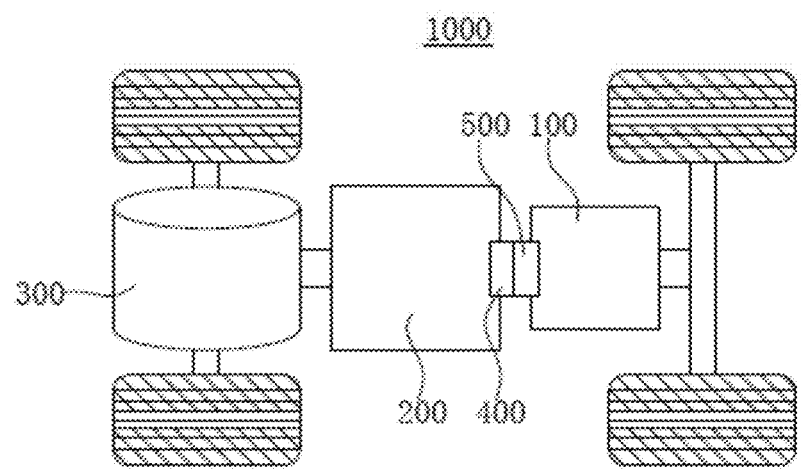
FIG. 1 is a schematic structural diagram of a vehicle according to some embodiments of this application.

The accompanying drawings are not drawn to scale.

REFERENCE SIGNS vehicle 1000;
battery 100;
controller 200;

motor 300;
connector 400;
plug connector 500;
upper cover 10;
battery cell 20;
lower cover 30;
mounting base 1;
mounting plate 11;
fixing member 12;
bottom plate 121;
side plate 122;
communication channel 13;
guide cavity 131;
accommodating cavity 132;
mounting cavity 14;
notch 141;
fixing boss 15;
connection terminal 2;
first connection portion 21;
intermediate portion 22;
second connection portion 23;
mounting hole 24;
first restraining boss 25;
second restraining boss 26;
temperature sensor 3;
signal wire 4;
sealing member 5;
body portion 51;
boss 52;
cover portion 53;
restraining member 6;
restraining cover 61;
restraining ring 62; and
restraining space 63.

DETAILED DESCRIPTION

The following further describes the implementations of this application in detail with reference to the accompanying drawings and embodiments. The detailed description of the embodiments and the accompanying drawings are intended to illustrate the principle of this application, rather than to limit the scope of this application, meaning this application is not limited to the embodiments described herein.

In the description of this application, it should be noted that, unless otherwise stated, "a plurality of" means at least two; and the orientations or positional relationships indicated by the terms "upper", "lower", "left", "right", "inside", "outside", and the like are merely for ease and brevity of description of this application rather than indicating or implying that the means or components mentioned must have specific orientations or must be constructed or manipulated according to particular orientations. These terms shall therefore not be construed as limitations on this application. In addition, the terms "first", "second", "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The orientation terms appearing in the following description all are directions shown in the figures, and do not limit the specific structure of this application. In the description of this application, it should also be noted that unless otherwise specified and defined explicitly, the terms "mount", "connect", and "join" should be understood in their general senses. For example, they may refer to a fixed connection, a detachable connection, or an integral connection, and may refer to a direct connection or an indirect connection via an intermediate medium. Persons of ordinary skill in the art can understand specific meanings of these terms in this application as appropriate to specific situations.

In this application, the battery cell may include a lithium-ion secondary battery cell, a lithium-ion primary battery cell, a lithium-sulfur battery, a sodium-lithium-ion battery, a sodium-ion battery, a magnesium-ion battery, or the like. This is not limited in the embodiments of this application. The battery cell may be cylindrical, flat, cuboid, or of other shapes, which is not limited in the embodiments of this application either. Battery cells are typically divided into three types by packaging method: cylindrical cell, prismatic cell, and pouch cell. This is not limited in the embodiments of this application either.

The battery mentioned in the embodiments of this application is a single physical module that includes one or more battery cells for providing a higher voltage and capacity. For example, the battery mentioned in this application may include a battery module, a battery pack, or the like. A battery typically includes a box configured to enclose one or more battery cells. The box can prevent liquids or other foreign matter from affecting charging or discharging of the battery cell.

The battery cell includes an electrode assembly and an electrolyte. The electrode assembly includes a positive electrode plate, a negative electrode plate, and a separator. The battery cell mainly relies on movement of metal ions between a positive electrode plate and a negative electrode plate to work. The positive electrode plate includes a positive electrode current collector and a positive electrode active substance layer. The positive electrode active substance layer is applied on a surface of the positive electrode current collector, and a current collector uncoated with the positive electrode active substance layer protrudes from the current collector coated with the positive electrode active substance layer and serves as a positive tab after stacking. A lithium-ion battery is used as an example, for which, the positive electrode current collector may be made of aluminum and the positive electrode active substance may be lithium cobaltate, lithium iron phosphate, ternary lithium, lithium manganate, or the like. The negative electrode plate includes a negative electrode current collector and a negative electrode active substance layer. The negative electrode active substance layer is applied on a surface of the negative electrode current collector. A current collector uncoated with the negative electrode active substance layer protrudes from the current collector coated with the negative electrode active substance layer and serves as a negative tab after stacking. The negative electrode current collector may be made of copper, and the negative electrode active substance may be carbon, silicon, or the like. The separator may be made of PP (polypropylene, polypropylene), PE (polyethylene, polyethylene), or the like. In addition, the electrode assembly may be a wound structure or a stacked structure, but the embodiments of this application are not limited thereto.

The applicant has found that in existing vehicles, it is necessary to electrically connect a battery and an electric part of the vehicle through an electrical connector to facilitate battery replacement. An existing electrical connector is typically a male plug and a female plug mating with each other, one of which is provided on the battery and the other of which is electrically connected to the electric part. During battery replacement or vehicle maintenance, the male plug and the female plug need to be plugged and unplugged multiple times, external foreign matter may enter between the male plug and female plug during the plugging and unplugging, resulting in operation anomaly of the electrical connector in subsequent use and thus affecting operation of the battery. After analyzing and studying the structure and use environment of electrical connectors, the applicant has found that during vehicle use, operation anomaly of the connectors leads to driving anomaly of vehicles, which in turn causes safety accidents, and that existing connectors cannot detect their own working status, making it impossible for users to discover operation anomaly of connectors in time and thus delaying the processing time.

In view of the foregoing problems found by the applicant, the applicant has improved the structure of electrical connectors. The technical solution described in the embodiments of this application is applicable to any scenario where electrical connection is required, which may be electrical connection between batteries and vehicles or electrical connection between batteries and other electric apparatuses.

The electric apparatus may be a vehicle, a mobile phone, a portable device, a notebook computer, a ship, a spacecraft, an electric toy, an electric tool, or the like. The vehicle may be a fossil fuel vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, for example, a game console, an electric toy car, an electric toy ship, an electric toy airplane, and the like. The electric tool includes an electric metal cutting tool, an electric grinding tool, an electric assembly tool, and an electric railway-specific tool, for example, an electric drill, an electric grinder, an electric wrench, an electric screwdriver, an electric hammer, an electric impact drill, a concrete vibrator, and an electric planer. The embodiments of this application impose no special limitation on the foregoing electric apparatus.

For ease of description, the electric apparatus of an embodiment of this application being a vehicle 1000 is used as an example for description of the following embodiments.

FIG. 1 is a schematic structural diagram of a vehicle according to some embodiments of this application. Refer to FIG. 1. The vehicle 1000 may be a fuel vehicle, a gas vehicle, or a new energy vehicle, and the new energy vehicle may be a battery electric vehicle, a hybrid electric vehicle, a range-extended electric vehicle, or the like. The vehicle 1000 is provided with a battery 100 inside, and the battery 100 may be disposed at the bottom, front, or rear of the vehicle 1000. The battery 100 may be configured to supply power to the vehicle 1000. For example, the battery 100 may be used as an operational power source for the vehicle 1000. The vehicle 1000 may further include a controller 200 and a motor 300, where the controller 200 is configured to control the battery 100 to supply power to the motor 300, for example, to satisfy power needs of start, navigation, and driving of the vehicle 1000. The vehicle 1000 further includes a connector 400 and a plug connector 500 connected to each other. The battery 100 and the motor 300 are electrically connected to each other through the connector 400 and the plug connector 500. The connector 400 and the plug connector 500 mate with each other structurally so that a user can quickly plug and unplug the connector 400 and the plug connector 500, facilitating replacement of the battery 100 for the user.

In some embodiments of this application, the battery 100 can be used as not only the operational power source for the vehicle 1000 but also a driving power source for the vehicle 1000, replacing or partially replacing fossil fuel or natural gas to provide driving traction for the vehicle 1000.

Figure 2:
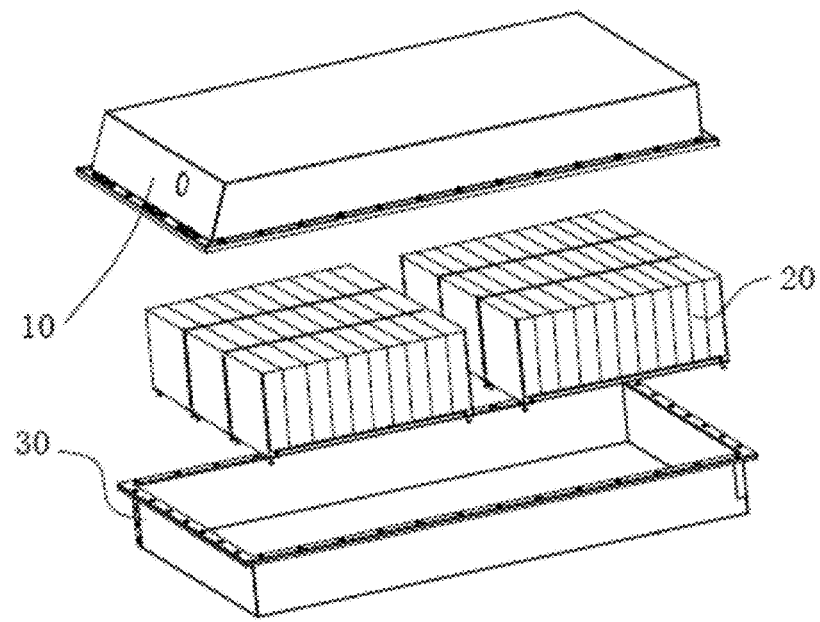
FIG. 2 is a schematic structural exploded view of a battery according to some embodiments of this application.

FIG. 2 is an exploded view of a battery according to some embodiments of this application. Refer to FIG. 2. The battery 100 includes a box (not marked) and a battery cell 20. In some embodiments, the box may include an upper cover 10 and a lower cover 30. The upper cover 10 and the lower cover 30 fit together to jointly define an accommodating space for accommodating the battery cell 20. The lower cover 30 may be a hollow structure with one end open, and the upper cover 10 may be a plate structure. The upper cover 10 covers an open side of the lower cover 30 so that the upper cover 10 and the lower cover 30 jointly define the accommodating space. Alternatively, the upper cover 10 and the lower cover 30 may both be hollow structures with one side open, and an open side of the upper cover 10 covers the open side of the lower cover 30. Certainly, the box formed by the upper cover 10 and the lower cover 30 may have a variety of shapes such as cylinder and cuboid. The box of the battery 100 may be directly mounted on the vehicle 1000, or the box of the battery 100 may be connected to a mounting base provided on the vehicle 1000, so as to fix the battery 100 to the vehicle 1000. In the mounting base and the battery 100, one is provided with a connector 400 and the other one is provided with a plug connector 500, so as to enable the battery 100 to supply power to an electric part in the vehicle 1000.

In the battery 100, multiple battery cells 20 may be present, and the multiple battery cells 20 may be connected in series, parallel, or series-parallel, where being connected in series-parallel means a combination of series and parallel connections of the multiple battery cells 20. The multiple battery cells 20 may be directly connected in series, parallel, or series-parallel, and then an entirety of the multiple battery cells 20 is accommodated in the box; or certainly, the battery 100 may be formed by multiple battery cells 20 connected in series, parallel, or series-parallel first to form battery modules and then multiple battery modules being connected in series, parallel, or series-parallel to form an entirety which is accommodated in the box. The battery 100 may further include other structures. For example, the battery 100 may further include a busbar configured to implement electrical connection between the plurality of battery cells 20.

Each battery cell 20 may be a secondary battery cell or a primary battery cell, and may be a lithium-sulfur battery cell, a sodium-ion battery cell, or a magnesium-ion battery cell, without being limited thereto. The battery cell 20 may be cylindrical, flat, cuboid, or of other shapes.

Figure 3:
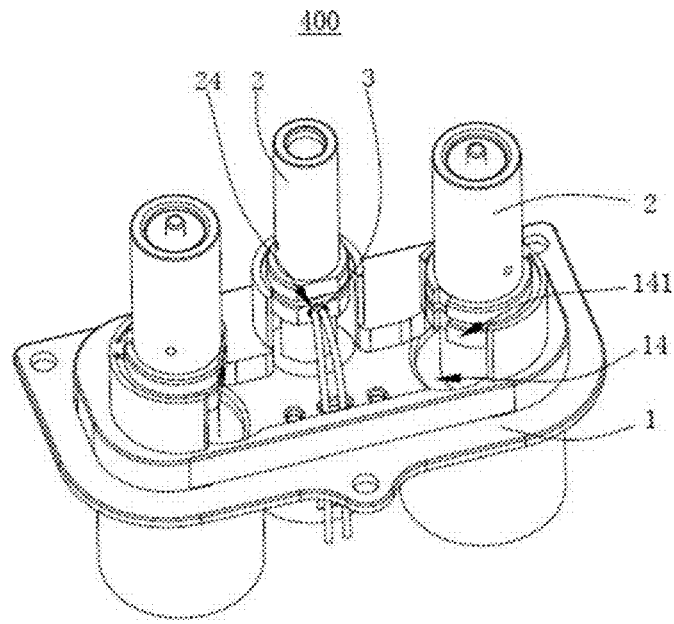
FIG. 3 is a three-dimensional structural diagram of a connector according to some embodiments of this application.
Figure 4:
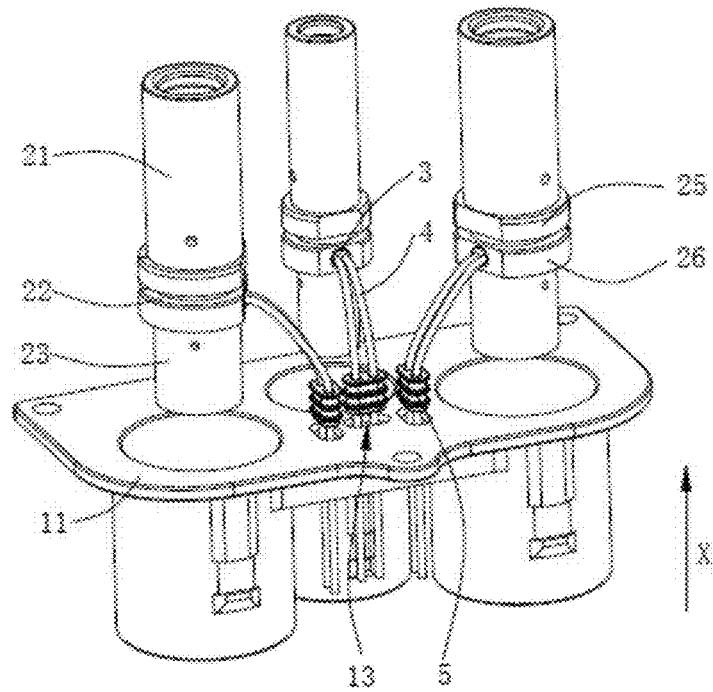
FIG. 4 is a schematic diagram of a partially disassembled structure of a connector according to some embodiments of this application.
Figure 5:
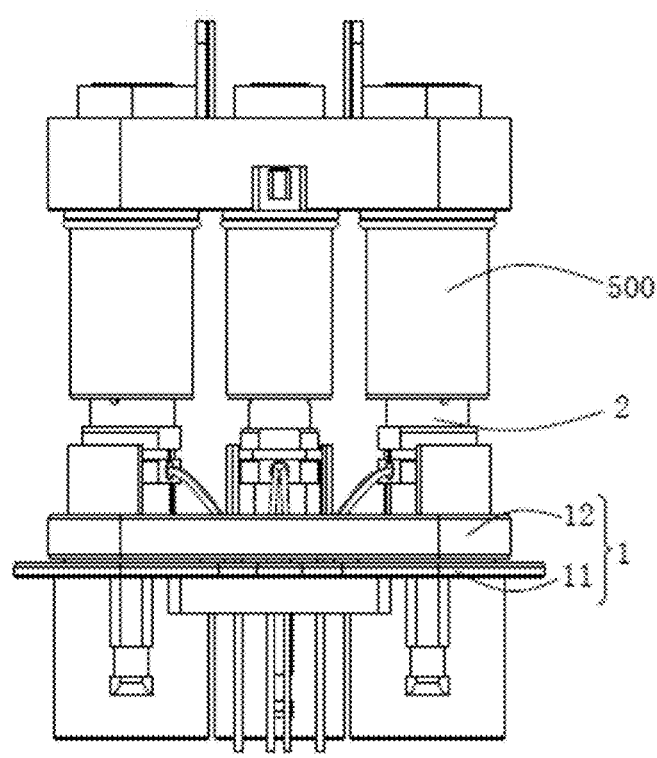
FIG. 5 is a schematic diagram of a planar structure of a connector and an external plug connector that are assembled according to some embodiments of this application.

According to some embodiments of this application, also refer to FIGS. 3 to 5. This application provides a connector 400. The connector 400 includes a mounting base 1, a connection terminal 2, and a temperature sensor 3, the connection terminal 2 being fixed to the mounting base 1. The connection terminal 2 includes a first connection portion 21 and a second connection portion 23 disposed opposite each other, the first connection portion 21 is configured to electrically connect to an external plug connector 500, and the second connection portion 23 is configured to electrically connect to an external wire. The temperature sensor 3 is in contact with an intermediate portion 22 and configured to detect temperature of the connection terminal 2.

The connector 400 provided in this application can be used for electrical connection between a power supply device and an electric device. For ease of description, an example in which the power supply device is the battery 100 and the electric device is the vehicle 1000 is used for description below. The connector 400 provided in this application may be provided on the vehicle 1000 and electrically connected to an electric part in the vehicle 1000 directly or indirectly through a wire, or may be provided on the battery 100 and electrically connected to an electrode terminal of the battery 100 directly or indirectly through a wire. It can be understood by persons skilled in the art that when the connector 400 provided in this application is connected to the electric part in the vehicle 1000 through a wire, an electrode terminal of the battery 100 is electrically connected to the external plug connector 500 and the external plug connector 500 is in contact with the first connection portion 21, so as to implement electrical conduction; and that when the connector 400 provided in this application is connected to the electrode terminal of the battery 100 through a wire, an electric part in the vehicle 1000 is electrically connected to the external plug connector 500 and the external plug connector 500 is in contact with the first connection portion 21, so as to implement electrical conduction.

In this application, the wire connected to the second connection portion 23 may specifically be a conductive cable, a conductive line embedded in an insulating structure, or a conductive metal structure. The wire is not limited to a specific form in this application provided that electrical communication between the connection terminal 2 and the power supply device or electric device can be implemented. Similarly, the external plug connector 500 is not limited in structure in this application, either. The external plug connector 500 may specifically have a jack so that the first connection portion 21 can be inserted into the jack to electrically connect to the external plug connector 500. The external plug connector 500 may alternatively include a hollow plug, and the first connection portion 21 is inserted into a hollow region of the plug to electrically connect to the external plug connector 500. The external plug connector 500 may alternatively include a solid plug, the first connection portion 21 is a hollow structure, and the external plug connector 500 is inserted into a hollow region of the first connection portion 21 to electrically connect to the external plug connector 500.

The temperature sensor 3 may specifically be a thermistor such as a negative temperature coefficient (NTC) thermistor or a positive temperature coefficient (PTC) thermistor. In other words, resistance of the temperature sensor 3 changes with the temperature of the temperature sensor 3. It can be understood that the temperature sensor 3 may alternatively be of another type provided that it can detect temperature. Optionally, the temperature sensor 3 is a PT1000 thermistor. When the temperature of the connection terminal 2 changes, because the temperature sensor 3 is in contact with the connection terminal 2, the temperature of the temperature sensor 3 changes with the temperature of the connection terminal 2, thereby causing a resistance change of the temperature sensor 3. The resistance change can be output as an analog signal or digital signal, and the analog signal or digital signal may be further analyzed so as to implement temperature detection on the connection terminal 2 by the temperature sensor 3. The temperature sensor 3 may establish a wireless signal connection to an external controller according to a preset communication protocol or may establish a wired signal connection to the external controller through signal wires 4. The temperature sensor 3 send detected data to the external controller so that the external controller can issue warning information or control the operation of the battery 100 or vehicle 1000, so as to avoid safety accidents caused by operation anomaly of the connector 400.

In this application, with the temperature sensor 3 disposed in direct contact with the connection terminal 2, the temperature of the connection terminal 2 can be detected to help a user find operation anomaly of the connector 400 in time, so as to avoid safety accidents caused by operation anomaly of the connector 400, thereby improving the safety.

In some embodiments, the connection terminal 2 further includes an intermediate portion 22, the first connection portion 21, the intermediate portion 22, and the second connection portion 23 are connected sequentially in a first direction X, and the temperature sensor 3 is in contact with the intermediate portion 22. The temperature sensor 3 being in contact with the intermediate portion 22 of the connection terminal 2 facilitates electrical connection of the first connection portion 21 and the external plug connector 500 and electrical connection of the second connection portion 23 and the external wire.

In some embodiments, the connection terminal 2 is provided with a mounting hole 24, the mounting hole 24 being located at the intermediate portion 22; and at least a part of the temperature sensor 3 is accommodated in the mounting hole 24. With the temperature sensor 3 accommodated in the mounting hole 24, the temperature sensor 3 and the connection terminal 2 are stable in position with respect to each other, and the temperature detected by the temperature sensor 3 is closer to an actual temperature of the connection terminal 2, thereby improving the detection accuracy. In addition, the mounting hole 24 providing space to accommodate the temperature sensor 3 is conducive to miniaturization of the connector 400. In particular, when the first connection portion 21 is a hollow structure and the external plug connector 500 needs to be inserted into the hollow region to implement electrical connection, if the mounting hole 24 is disposed at the first connection portion 21, the first connection portion 21 needs to have a thicker wall, so as to allow provision of the mounting hole 24 that can accommodate the temperature sensor 3 and prevent the temperature sensor 3 placed into the mounting hole 24 from affecting the insertion of the plug connector 500. The thicker wall is not conducive to the miniaturization of the connector 400. Therefore, it is easier to provide the mounting hole 24 large enough to accommodate the temperature sensor 3 at the intermediate portion 22 than at the first connection portion 21.

The temperature sensor 3 is placed in the mounting hole 24, and heat transfer between the temperature sensor 3 and the connection terminal 2 may be implemented through direct contact or may be implemented through air between the temperature sensor 3 and the connection terminal 2. An outer surface of the temperature sensor 3 may be further coated with a thermal conductive adhesive so as to implement heat transfer between the temperature sensor 3 and the connection terminal 2 through the thermal conductive adhesive and increase an indirect contact area between the temperature sensor 3 and the connection terminal 2, thereby improving the efficiency of heat transfer and improve the timeliness of temperature detection data. The temperature sensor 3 may further be in interference fit with an inner wall surface of the mounting hole 24. This allows stable connection between the temperature sensor 3 and the intermediate portion 22 and increases a direct contact area between the temperature sensor 3 and the connection terminal 2, facilitating heat transfer between the temperature sensor 3 and the connection terminal 2.

Figure 6:
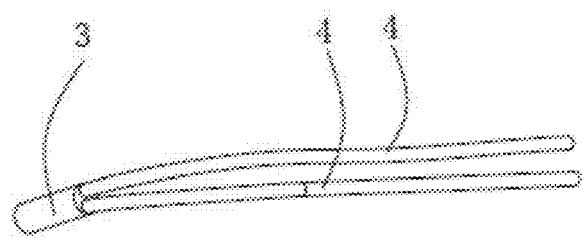
FIG. 6 is a three-dimensional structural diagram of a temperature sensor and signal wires according to some embodiments of this application.

Refer to FIG. 6. The mounting base 1 has a communication channel 13 extending along the first direction, and the connector 400 further includes signal wires 4, the signal wire 4 being electrically connected to the temperature sensor 3 on one end and passing through the communication channel 13 on the other end to electrically connect to an external controller.

The mounting base 1 may include a mounting plate 11 and a fixing member 12 disposed on the mounting plate 11. The mounting plate 11 and the fixing member 12 are disposed opposite each other in the first direction. Via holes provided in the mounting plate 11 and via holes provided in the fixing member 12 communicate with each other to form the communication channel 13. Certainly, the mounting base 1 may alternatively include other parts than the mounting plate 11 and the fixing member 12. In this case, the communication channel 13 can be formed through communication of via holes provided in multiple parts. With the signal wire 4 passing through the communication channel 13, the signal wire 4 can be bound by the communication channel 13, preventing the signal wire 4 from interfering with connection of the connection terminal 2 and the external plug connector 500. For example, when the mounting base 1 needs to be hermetically connected to a wire-housing conduit in the vehicle 1000, the signal wire 4 passing through the communication channel 13 can prevent the signal wire 4 from interfering with the hermetic connection of the mounting base 1 and the conduit.

The external controller may specifically be a vehicle controller of the vehicle 1000. The vehicle controller is configured to receive detection data sent by sensors in the vehicle 1000 as well as driving actions of a user, to issue a control command to each functional part of the vehicle 1000. Data collected by the temperature sensor 3 can be transmitted to the external controller through the signal wires 4 so that the external controller can perform processing based on the data. For example, under a condition that the data collected by the temperature sensor 3 is abnormal, the external controller controls the battery 100 electrically connected to the connector 400 to be turned off and controls a backup battery to be turned on, or the external controller controls a display screen to display an alarm that the connector 400 is operating abnormally to alert the user. In an embodiment, one temperature sensor 3 is connected to two signal wires 4, and the two signal wires 4 may pass through one communication channel 13 or may pass through separate communication channels 13. Persons skilled in the art can determine the number and location of the communication channel 13 based on the type of the temperature sensor 3, and the location of the external controller connected to the signal wire 4 in the vehicle 1000.

Figure 7:
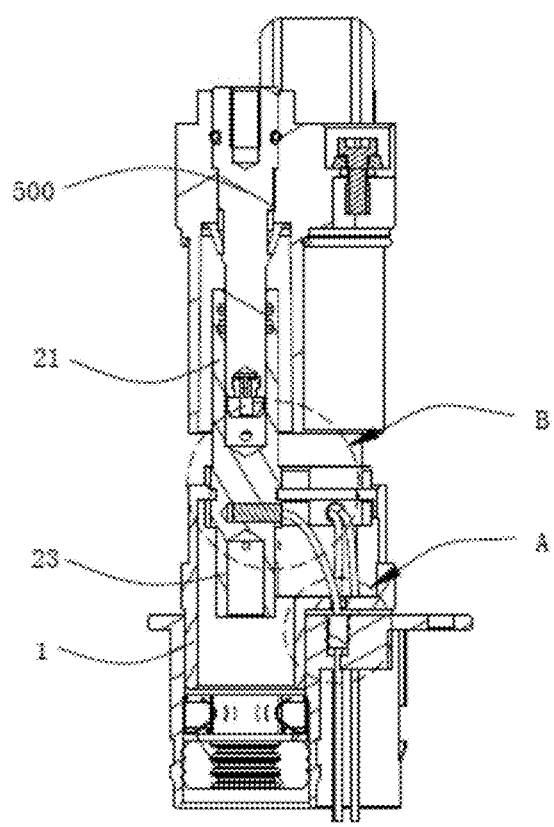
FIG. 7 is a schematic cross-sectional structural diagram of a connector and an external plug connector that are assembled according to some embodiments of this application.
Figure 8:
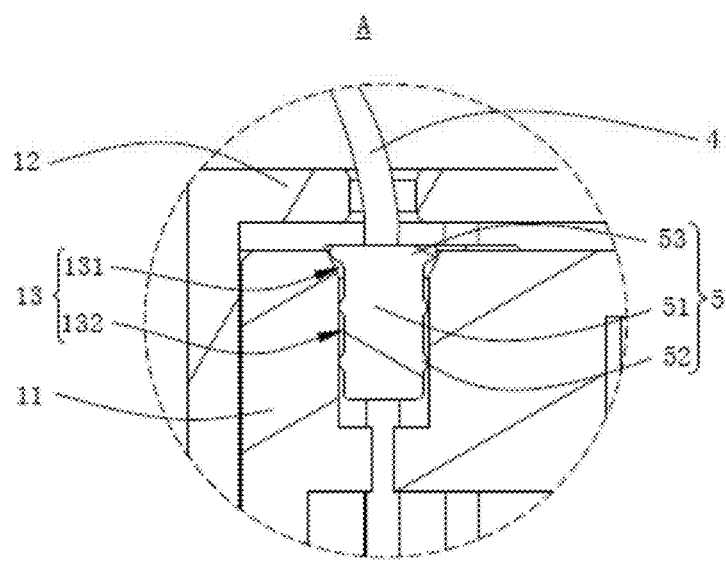
FIG. 8 is an enlarged schematic structural diagram of portion A in FIG. 7.

Refer to FIGS. 7 and 8. The connector 400 further includes a sealing member 5 having a through hole, the signal wire 4 passes through the through hole, and the sealing member 5 is disposed in the communication channel 13 to seal the communication channel 13. With the sealing member 5 disposed to seal the communication channel 13, water, foreign matter, and the like are unable to move from one side of the mounting base 1 to the other side of the mounting base 1 through the communication channel 13. For example, when the mounting base 1 is hermetically connected to a wire-housing conduit holder in the vehicle 1000, the sealing member 5 seals the communication channel 13 so that water, foreign matter, and the like cannot enter the conduit holder through the communication channel 13, thereby preventing water, foreign matter, and the like from affecting wire connection in the conduit holder.

The sealing member 5 includes a body portion 51 and a boss 52 disposed on the body portion 51, the body portion 51 and the boss 52 are accommodated in the communication channel 13, and the boss 52 is configured to abut against an inner wall surface of the communication channel 13. The sealing member 5 may be made of an elastic material. When the sealing member 5 is placed in the communication channel 13, the boss 52 undergoes elastic deformation and abuts between the body portion 51 and the inner wall surface of the communication channel 13 so that the sealing member 5 seals the communication channel 13. To improve the sealing performance of the sealing member 5, the boss 52 may be provided in a ring shape around the body portion 51. Multiple ring bosses 52 may alternatively be provided, and the multiple ring bosses 52 are sequentially spaced apart.

The sealing member 5 further includes a cover portion 53 connected to the body portion 51, and the communication channel 13 includes a guide cavity 131 and an accommodating cavity 132 communicating with each other; where the guide cavity 131 gradually decreases in radial dimension along a direction from the guide cavity 131 to the accommodating cavity 132, the cover portion 53 mates with the guide cavity 131, and the body portion 51 and the boss 52 are accommodated in the accommodating cavity 132.

A radial dimension of the cover portion 53 may be larger than a radial dimension of the body portion 51 so that the cover portion 53 functions as a cap to cover the body portion 51. The guide cavity 131 with gradually decreasing radial dimension facilitates the insertion of the sealing member 5 into the communication channel 13. The cover portion 53 mating with the guide cavity 131 allows the cover portion 53 to prevent water and foreign matter from entering the communication channel 13, thereby further improving the sealing performance of the sealing member 5 in sealing the communication channel 13.

In the embodiment of FIG. 8, because the mounting base 1 includes the mounting plate 11 and the fixing member 12 disposed on the mounting plate 11, both the guide cavity 131 and the accommodating cavity 132 are provided in the mounting plate 11. During assembly of the connector 400, the sealing member 5 is first wrapped around the signal wire 4, and then the sealing member 5 is inserted into the accommodating cavity 132 through the guide cavity 131, with the cover portion 53 abutting against an inner wall surface of the guide cavity 131, and finally, the fixing member 12 with the via hole is disposed on the mounting plate 11, with the via hole corresponding to the guide cavity 131 so that the signal wire 4 can conveniently pass through the via hole. The edge of the cover portion 53 is disposed between the fixing member 12 and the mounting plate 11, so as to prevent the sealing member 5 from moving out of the communication channel 13 during the use of the connector 400.

Figure 9:
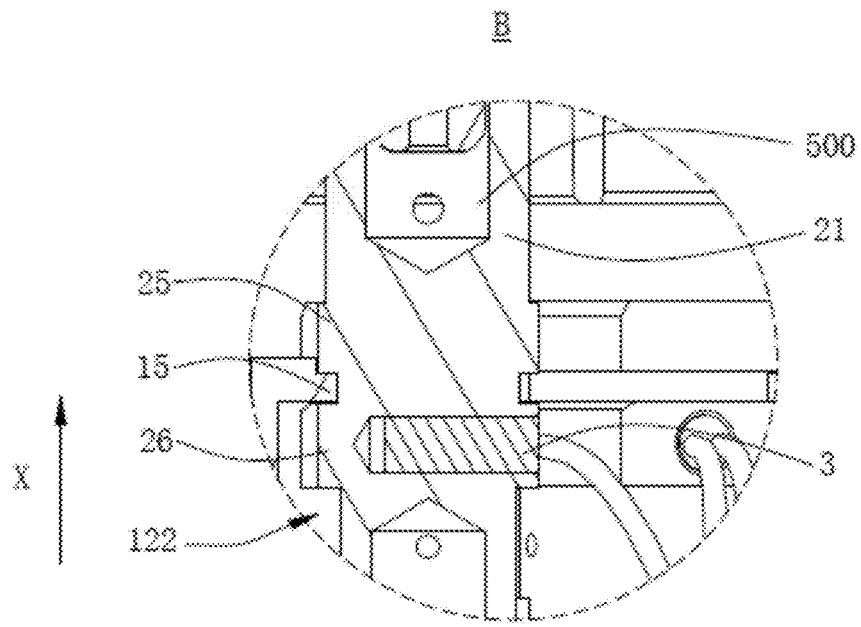
FIG. 9 is an enlarged schematic structural diagram of portion B in FIG. 7.
Figure 10:
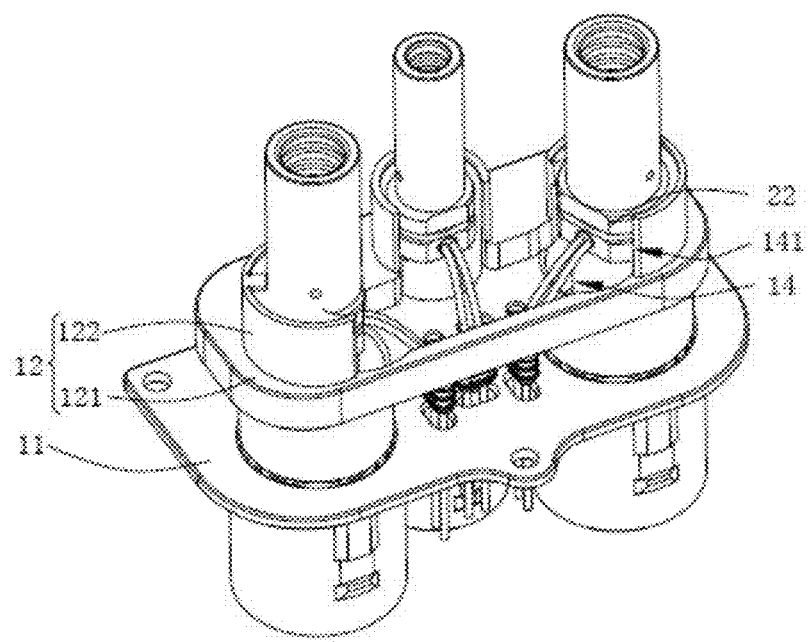
FIG. 10 is a schematic diagram of a disassembled structure of a connector according to some embodiments of this application.

Refer to FIGS. 9 and 10. The mounting base 1 includes a mounting cavity 14 having a notch 141, the intermediate portion 22 is inserted into the mounting cavity 14 and connected to the mounting base 1, the mounting hole 24 is disposed facing toward the notch 141, and the signal wire 4 sequentially passes through the communication channel 13 and the notch 141 to electrically connect to the temperature sensor 3.

Optionally, the fixing member 12 includes a bottom plate 121 disposed opposite the mounting plate 11 and a bent side plate 122 protruding from the bottom plate 121. The side plate 122 encloses the mounting cavity 14, and the side plate 122 is provided with the notch 141 communicating with the mounting cavity 14. The side plate 122 surrounds the connection terminal 2. In the embodiment of FIG. 10, the connection terminal 2 is cylindrical, and accordingly, the side plate 122 forms an annulus with the notch 141 around the connection terminal 2. The inner wall surface of the mounting cavity 14 can restrain the movement of the connection terminal 2 so as to improve the stability of the connection between the connection terminal 2 and the mounting base 1. The mounting hole 24 being disposed facing toward the notch 141 allows the temperature sensor 3 to be disposed in the mounting hole 24 through the notch 141, thereby facilitating the mounting of the temperature sensor 3 and preventing a part of the mounting base 1 connected to the connection terminal 2 from interfering with wiring of the signal wire 4.

In some embodiments, the mounting base 1 further includes a fixing boss 15 protrusively disposed on an inner wall surface of the mounting cavity 14, the connection terminal 2 further includes a first restraining boss 25 and a second restraining boss 26 that are protrusively disposed on the intermediate portion 22, and a restraining recess (not marked) mating with the fixing boss 15 is formed between the first restraining boss 25 and the second restraining boss 26.

The fixing boss 15 may be a semi-circular ring protruding from the side plate 122, and the first restraining boss 25 and the second restraining boss 26 each may be disposed in a ring shape. During assembly, the connection terminal 2 can be moved into the mounting cavity 14 through the notch 141, with the fixing boss 15 fitting with the first restraining boss 25 and second restraining boss 26. Provision of the fixing boss 15, the first restraining boss 25, and the second restraining boss 26 in a mating relationship avoids displacement of the connection terminal 2 and the mounting base 1 in the first direction X, thereby improving the stability of the connection between the intermediate portion 22 and the mounting base 1.

In some embodiments, the mounting hole 24 runs through the second restraining boss 26. Since the second restraining boss 26 is protrusively disposed on the intermediate portion 22, a radial dimension of the connection terminal 2 at the second restraining boss 26 is larger than a radial dimension at the restraining recess, and provision of the mounting hole 24 on the second restraining boss 26 can allow a deeper mounting hole 24, facilitating provision of a larger temperature sensor 3 in the mounting hole 24.

Figure 11:
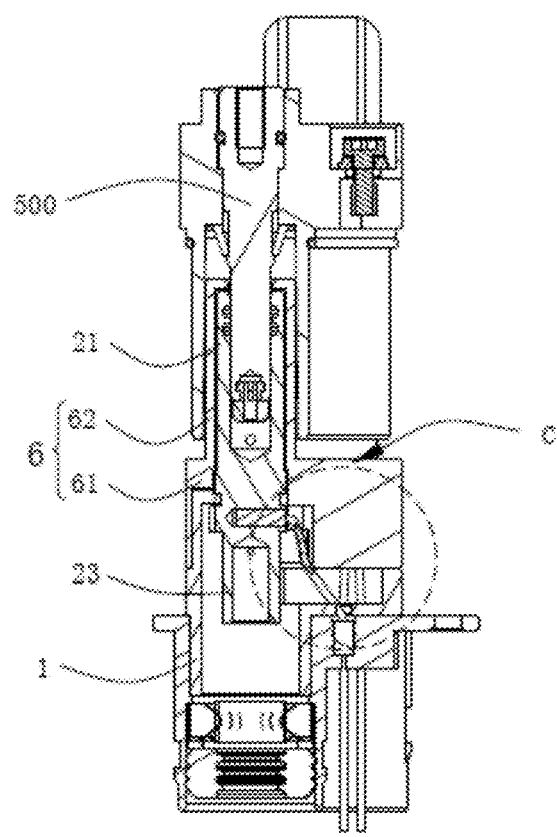
FIG. 11 is a schematic cross-sectional structural diagram of a connector and an external plug connector that are assembled according to some other embodiments of this application.
Figure 12:
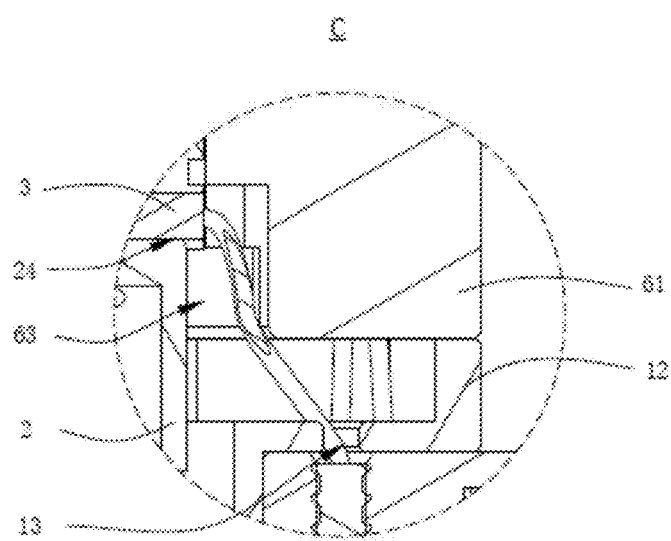
FIG. 12 is an enlarged schematic structural diagram of portion C in FIG. 11.

Refer to FIGS. 11 and 12. In some other embodiments, the connector 400 further includes a restraining member 6 disposed on the mounting base 1, the restraining member 6, the mounting base 1, and the connection terminal 2 enclose a restraining space 63 communicating with the mounting hole 24 and the communication channel 13, and a part of the signal wire 4 is accommodated in the restraining space 63.

The restraining member 6 includes a restraining cover 61 and a restraining ring 62 that are connected to each other. The restraining cover 61 covers a side of the fixing member 12 close to the first connection portion 21. The restraining cover 61 has a restraining hole mating with the connection terminal 2 so that the connection terminal 2 can be connected to the fixing member 12 through the restraining hole. The restraining ring 62 bends from an inner wall of the restraining hole and extends therefrom so that the restraining ring 62 can surround the first connection portion 21, so as to restrain the first connection portion 21. In an embodiment, the restraining cover 61, the bottom plate 121, and the connection terminal 2 enclose a restraining space 63, and one part of the temperature sensor 3 may be accommodated in the mounting hole 24 and the other part thereof is accommodated in the restraining space 63. Alternatively, the entire temperature sensor 3 may be accommodated in the mounting hole 24. The signal wire 4 beyond the communication channel 13 may be accommodated in the restraining space 63 and connected to the temperature sensor 3.

With the restraining member 6 provided, the temperature sensor 3 and the part of the signal wire 4 can move only within the restraining space 63, so as to be restrained by the restraining member 6, thereby protecting the temperature sensor 3 from interference by external forces or external impurities, and preventing the temperature sensor 3 from moving out of the mounting hole 24 while such movement results in inaccurate detected temperature data. It can be understood by persons skilled in the art that better matching between the shape of the restraining space 63 and the wiring of the signal wire 4 or mounting position of the temperature sensor 3 means that the restraining member 6 better restrains the temperature sensor 3 and the signal wire 4. Therefore, a first restraining groove mating with the signal wire 4 may alternatively be provided in the restraining space 63 so that a part of the signal wire 4 can be distributed along only an extension direction of the first restraining groove; or a second restraining groove mating with an outer surface of the temperature sensor 3 is provided in the restraining space 6 so that an end of the temperature sensor 3 connected to the signal wires 4 can move only within the second restraining groove.

In some embodiments, multiple connection terminals 2 and temperature sensors 3 are provided, and the multiple temperature sensors 3 are provided in one-to-one correspondence with the connection terminals 2 so that the temperature of each connection terminal 2 can be detected, thereby improving the detection accuracy. In the embodiment of FIG. 4 and FIG. 10, the connector 400 includes three connection terminals 2. Three temperature sensors 3 are in contact with the three connection terminals 2 respectively. In addition, signal wires 4 mounted in corresponding mounting holes 24 and connected to the three temperature sensors 3 pass through three communication channels 13 respectively. Certainly, to reduce the number of holes on the mounting base 1, the signal wires 4 connected to multiple temperature sensors 3 may pass through one communication channel 13.

According to a second aspect, this application provides an electric apparatus. Refer again to FIG. 1. The electric apparatus includes an electric part, a controller 200, and a battery 100, where the controller 200 is configured to control the operation of the electric apparatus, and the battery 100 is configured to provide electrical energy for the electric part; and the foregoing connector 400, where one of the first connection portion 21 and the second connection portion 23 is electrically connected to the battery 100 and the other is electrically connected to the electric part, and the temperature sensor 3 is signally connected to the controller 200.

The electric apparatus may be any of the foregoing device or system that uses the battery 100. Electric parts are various functional parts disposed in the electric apparatus. Each electric part can fit with the connector 400 via a plug connector 500. Specifically, the electric part may be a battery base with the plug connector 500, a motor 300 with the plug connector 500, or the like. The connector 400 can allow an electrical communication between the battery and the electric part, and the temperature sensor 3 can transmit detected temperature data to the controller 200, facilitating operation control of the electric apparatus by the controller 200 according to the temperature data.

According to some embodiments of this application, refer to FIGS. 3 to 5. This application provides a connector 400.

The connector 400 includes a mounting base 1, a connection terminal 2, and a temperature sensor 3, the connection terminal 2 being fixed to the mounting base 1. The connection terminal 2 includes a first connection portion 21, an intermediate portion 22, and a second connection portion 23 that are connected sequentially in a first direction X, the first connection portion 21 is configured to electrically connect to an external plug connector, and the second connection portion 23 is configured to electrically connect to an external wire. The temperature sensor 3 is in contact with the intermediate portion 22 and configured to detect temperature of the connection terminal 2. With the temperature sensor 3 disposed in direct contact with the connection terminal 2, the temperature of the connection terminal 2 can be obtained to help a user find operation anomaly of the connector 400 in time, so as to avoid safety accidents caused by operation anomaly of the connector 400. Provision of the temperature sensor 3 in contact with the intermediate portion 22 of the connection terminal 2 prevents the temperature sensor 3 from interfering with electrical connection of the first connection portion 21 and the external plug connector and interfering with electrical connection of the second connection portion 23 and the external wire.

Although this application has been described with reference to some preferred embodiments, various modifications to this application and replacements of the components therein with equivalents can be made without departing from the scope of this application. In particular, as long as there is no structural conflict, the various technical features mentioned in the embodiments can be combined in any manner. This application is not limited to the specific implementations disclosed in this specification but includes all technical solutions falling within the scope of the claims.

What is claimed is:

1. A connector, comprising:
    a mounting base;
    a connection terminal fixed to the mounting base, wherein the connection terminal comprises a first connection portion and a second connection portion disposed opposite each other, the first connection portion is configured to electrically connect to an external plug connector, and the second connection portion is configured to electrically connect to an external wire; and
    a temperature sensor in contact with the connection terminal and configured to detect temperature of the connection terminal;
    wherein the connection terminal further comprises an intermediate portion, the first connection portion, the intermediate portion, and the second connection portion are connected sequentially in a first direction, and the temperature sensor is in contact with the intermediate portion;
    wherein the connection terminal is provided with a mounting hole, the mounting hole being located at the intermediate portion; and at least a part of the temperature sensor is accommodated in the mounting hole;
    wherein the mounting base has a communication channel extending along the first direction, and the connector further comprises signal wires, a signal wire being electrically connected to the temperature sensor on one end and passing through the communication channel on the other end to electrically connect to an external controller; and
    wherein the mounting base comprises a mounting cavity having a notch, the intermediate portion is inserted into the mounting cavity and connected to the mounting base, the mounting hole is disposed facing toward the notch, and the signal wire sequentially passes through the communication channel and the notch to electrically connect to the temperature sensor.

2. The connector according to claim 1, wherein the connector further comprises a sealing member having a through hole, the signal wire passes through the through hole, and the sealing member is disposed in the communication channel to seal the communication channel.

3. The connector according to claim 2, wherein the sealing member comprises a body portion and a boss disposed on the body portion, the body portion and the boss are accommodated in the communication channel, and the boss is configured to abut against an inner wall surface of the communication channel.

4. The connector according to claim 3,
    wherein the sealing member further comprises a cover portion connected to the body portion, and the communication channel comprises a guide cavity and an accommodating cavity communicating with each other; and
    wherein the guide cavity gradually decreases in radial dimension along a direction from the guide cavity to the accommodating cavity, the cover portion mates with the guide cavity, and the body portion and the boss are accommodated in the accommodating cavity.

5. The connector according to claim 1, wherein the mounting base further comprises a fixing boss protrusively disposed on an inner wall surface of the mounting cavity, the connection terminal further comprises a first restraining boss and a second restraining boss that are protrusively disposed on the intermediate portion, and a restraining recess mating with the fixing boss is formed between the first restraining boss and the second restraining boss.

6. The connector according to claim 5, wherein the mounting hole runs through the second restraining boss.

7. The connector according to claim 1, wherein the temperature sensor is in interference fit with an inner wall surface of the mounting hole.

8. The connector according to claim 1, wherein the connector further comprises a restraining member disposed on the mounting base, the restraining member, the mounting base, and the connection terminal enclose a restraining space communicating with the mounting hole and the communication channel, and a part of the signal wire is accommodated in the restraining space.

9. The connector according to claim 1, wherein multiple connection terminals and temperature sensors are provided, and the multiple temperature sensors are provided in one-to-one correspondence with the connection terminals.

10. An electric apparatus, comprising:
    an electric part;
    a controller configured to control the operation of the electric apparatus;
    a battery configured to provide electrical energy for the electric part; and
    the connector according to claim 1,
    wherein one of the first connection portion and the second connection portion is electrically connected to the battery and the other is electrically connected to the electric part, and the temperature sensor is signally connected to the controller.

* * * * *